United States Patent
Kuwahara et al.

(10) Patent No.: US 8,068,874 B2
(45) Date of Patent: Nov. 29, 2011

(54) SYSTEM AND METHOD FOR CORRECTING SIGNAL DEVIATIONS IN A RADIO OVER FIBER NETWORK

(75) Inventors: Mikio Kuwahara, Hachioji (JP); Masanori Taira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 851 days.

(21) Appl. No.: 11/347,294

(22) Filed: Feb. 6, 2006

(65) Prior Publication Data

US 2007/0072646 A1    Mar. 29, 2007

(30) Foreign Application Priority Data

Sep. 29, 2005   (JP) ................. 2005-283795

(51) Int. Cl.
*H04B 1/38*    (2006.01)
(52) U.S. Cl. ............. 455/561; 455/562.1; 455/67.11; 342/368
(58) Field of Classification Search ........... 455/561, 455/562.1, 67.11; 342/368; 370/334
See application file for complete search history.

(56) References Cited

U.S. PATENT DOCUMENTS

| | | | |
|---|---|---|---|
| 6,249,250 B1 * | 6/2001 | Namekata et al. | 342/372 |
| 6,647,276 B1 * | 11/2003 | Kuwahara et al. | 455/562.1 |
| 6,987,989 B2 * | 1/2006 | Hiramatsu et al. | 455/562.1 |
| 2003/0143947 A1 | 7/2003 | Lyu | |
| 2003/0216156 A1 * | 11/2003 | Chun | 455/562.1 |
| 2006/0007040 A1 * | 1/2006 | Kawasaki | 342/368 |
| 2006/0079290 A1 * | 4/2006 | Seto et al. | 455/562.1 |
| 2006/0189353 A1 * | 8/2006 | Fujishima | 455/561 |
| 2007/0293269 A1 * | 12/2007 | Kuwahara et al. | 455/562.1 |

FOREIGN PATENT DOCUMENTS

| | | |
|---|---|---|
| JP | 2000 286629 | 10/2000 |
| JP | 2001 086058 | 3/2001 |
| JP | 2001 102979 | 4/2001 |
| JP | 2001-267990 | 9/2001 |
| JP | 2003 229797 | 8/2003 |
| JP | 2001-094332 | 4/2006 |

* cited by examiner

*Primary Examiner* — Patrick Edouard
*Assistant Examiner* — Michael Irace
(74) *Attorney, Agent, or Firm* — Brundidge & Stanger, P.C.

(57) ABSTRACT

In a wireless base station comprising a center unit, and a remote unit provided with an array antenna and connected to the center unit through an optical fiber, the center unit outputs to the optical fiber a transmission signal in a base band state prior to array processing, the remote unit performs the array processing of transmission signals in accordance with array weights and converts the transmission signals into RF signals, thereby to localize the compensation for transmission signal deviations occurring among the antenna elements on the remote unit side.

8 Claims, 7 Drawing Sheets

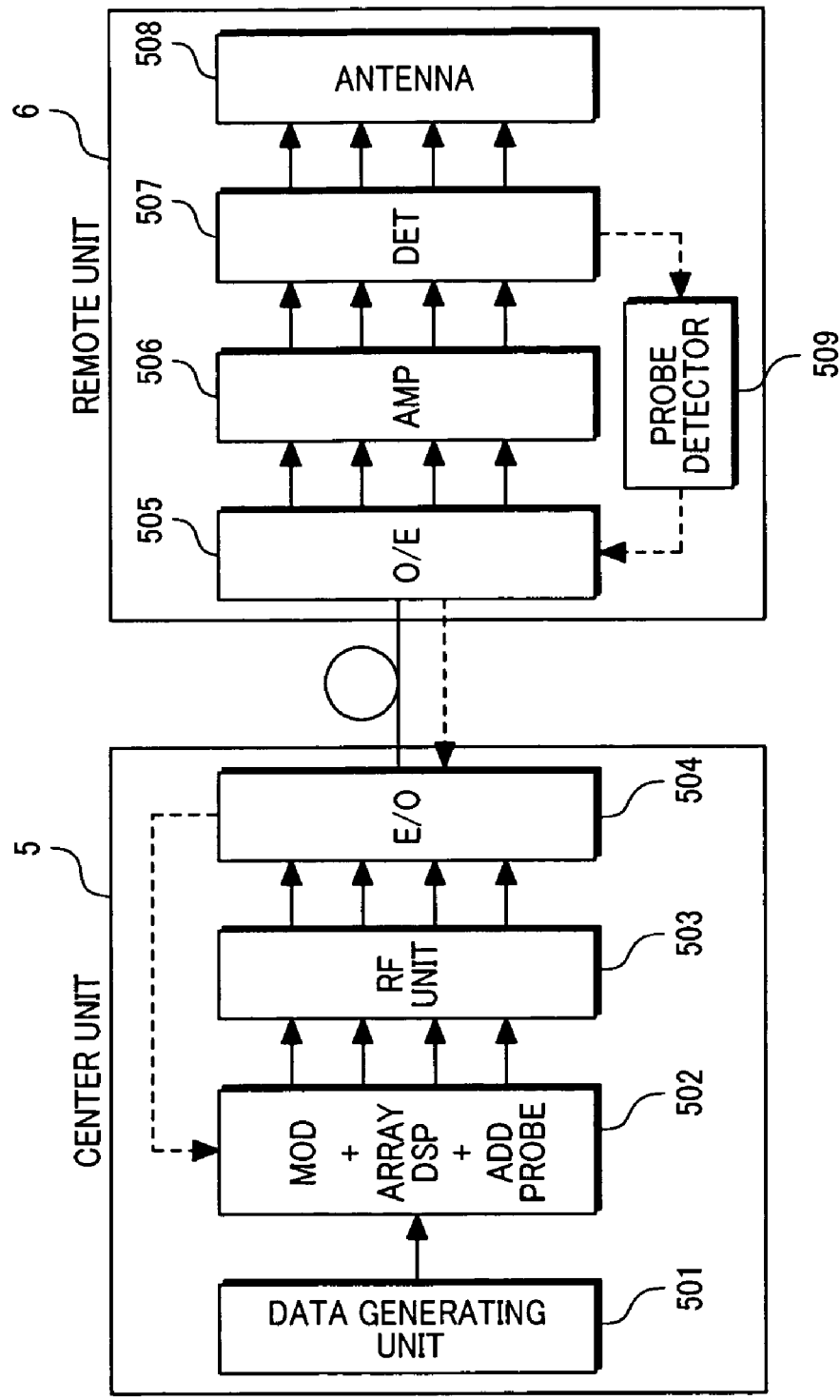

SYSTEM AND METHOD FOR CORRECTING SIGNAL DEVIATIONS IN A RADIO OVER FIBER NETWORK

CLAIM OF PRIORITY

The present application claims priority from Japanese application serial No. 2005-283795, filed on Sep. 29, 2005, the content of which is hereby incorporated by reference into this application.

BACKGROUND OF THE INVENTION

1. Field of the Invention

The present invention relates to a wireless base station and a communication method therefor. More specifically, the invention relates to a wireless base station separated into a center unit and a remote unit and to a communication method for communication between the center unit and the remote unit.

2. Description of Related Art

In the field of wireless communication systems, while changing is demanded to the fourth generation, the data rate has been enhanced, and the communication area has become ubiquitous, such that a need is considered to increase for system configurations of the type including a large number of small base stations with relatively low transmission power. In addition, in the case of a wireless base station, the system-installable site is restricted by the size of the system, such that technology called "radio on fiber (ROF)" is regarded important.

The ROF divides a base station into a center unit and a remote unit, and connects the units with an optical fiber communication path. According to the ROF, a remote unit device, for which the installation site is important, can be made compact by simplifying the function of the remote unit that is directly connected to an antenna, such that the impact of the installation site problem regarding the base station can be relaxed. For reduction of the circuit size of such a remote unit, an apparatus configuration is known in which, for example, the entirety of a base band section and a part of a radio frequency (RF) section are integrated into the center unit side, and the remote unit is provided only with an optical-electrical (O/E) converter unit, an electrical-optical (E/O) converter unit, and a power amplifier unit.

As another technical trend in the filed of wireless communication systems, attention is drawn to an array antenna called a smart antenna including multiple antenna elements. In the array antenna, weight calculation is performed on signals being transmitted and received through the multiple antenna elements, whereby transmission and reception directions of radio signals in the base station can be restricted. In addition, it is known that the array gain can be obtained from the weight calculation, or unnecessary interference signals can be reduced by the weight calculation.

As an example configuration with a combination of the ROF and the smart antenna, Japanese Unexamined Patent Publication No. 2001-94332 discloses a technique in which multiple RF signals corresponding to antenna elements of an array antenna are time multiplexed, thereby to synthesize the plurality of RF signals into a single signal. According to the technique disclosed in above Patent document, an object is to solve the problem of signal delay deviations (transmission time differences) occurring in an optical fiber in the event of parallel transmission of multiple signals by employing a wavelength multiplexing technique("wavelength multiplexing," hereafter).

In the case of parallel transmission of multiple signals in accordance with the wavelength multiplexing technique, since the signal propagation path in the optical fiber is different depending on the wavelength, a slight deviation occurs in the signal propagation time. When the center unit outputs transmission signals for the respective antenna elements to the optical fiber as RF signals (radio frequency signals), even a slight deviation of the signal propagation time causes a significant phase rotation. Therefore, even when transmission signals weighted by antenna element, a problem still occurs in that desired be an patterns cannot be formed as it is influenced by the phase rotation. According to the technique disclosed in the above Patent document, it is devised such that the multiple signals being supplied to the array antenna are time multiplexed so as to be output in the form of a single signal to the optical fiber, thereby to theoretically prevent the deviation.

On the other hand, Japanese Unexamined Patent Publication No. 2001-267990 discloses a technique as briefed hereinbelow. In the event of synchronous transmission of multiple signals to be supplied to an array antenna, the remote unit measures the signal propagation time deviation depending on the wavelength by using probe signals inserted by a center unit into the respective transmission signals, and then supplies the measurement results to the center unit, thereby to compensate for the deviation.

These conventional, previously proposed techniques will be described in more detail herebelow with reference to FIG. 8. A center unit 5 comprises a data generating unit 501 that generates transmission data, a signal processor unit 502, an RF unit 503, and a center-unit optical interface 504.

Data generated by the data generating unit 501 is input into the signal processor unit 502, and is converted into a plurality of signal streams (or, multiple signals) desired to be supplied the array antenna. The signal processor unit 502 executes three processings, namely, base band modulation, modulation in the spatial direction (array processing), and probe signal addition to the input signals.

For the base band modulation, coding with, for example, a convolution code or low density parity check (LDPC) code, anti-fading measures such as interleaving and repetition, and modulation such as quadrature phase shift keying (QPSK) and sixteen quadrature amplitude modulation (16 QAM) are executed. In the array processing, transmission weights are determined for the respective antenna elements, and weighting processing is executed on the respective transmission signal that has been base-band modulated. In the probe signal addition, a respective probe signal discriminatable from the transmission signal is generated and the probe signal is added to the transmission signal that has been array-processed.

Multiple transmission signals corresponding to the number of antenna elements being used for the transmission are output from the signal processor unit 502. In the state shown in FIG. 8, as an example, four streams of transmission signals are output from the signal processor unit 502. The transmission signals output from the signal processor unit 502 are input into the RF unit 503, and subjected to digital/analog conversion and frequency conversion thereon. The converted signals are then input into the center-unit optical interface 504. In the optical interface 504, the respective electric signals input from the RF unit 503 are converted into optical signals, and the optical signals are output in the form of a wavelength multiplexed optical signal to the optical fiber.

The optical signals being transmitted to the optical fiber are different in propagation characteristic depending on the wavelength. For this reason, deviations occur in, for example, phase and amplitude among the multiple transmission signals being supplied to the array antenna.

A remote unit 6 comprises a remote-unit optical interface 505, a power amplifier circuit 506, a signal detector unit 507, an array antenna 508, and a probe detector unit 509.

The remote-unit optical interface 505 executes processings in contrast with the center-unit optical interface 504 on multiple transmission signals input from the optical fiber, thereby converting a wavelength multiplexed optical signal into multiple analog RF signals. More specifically, a wavelength multiplexed optical signal input from the optical fiber is demultiplexed in terms of the wavelength by wavelength division processing, and optical signals of respective wave lengths are converted into electric signals by O/E conversion.

A plurality of signals output in parallel from the remote-unit optical interface 505 are amplified by the power amplifier circuit 506 comprising a plurality of amplifiers. In this event, deviations in the phases and amplitudes of amplified signals can occur depending on, for example, the differences in the characteristics of the respective amplifiers and temperatures. The transmission signals output in parallel from the power amplifier circuit 506 are input to the signal detector unit 507, and probe signals are detected from the respective transmission signals.

The transmission signals having passed through the signal detector unit 507 are transmitted as radio signals through the array antenna 508. The probe signals detected from the respective transmission signals by the signal detector unit 507 are input into the probe detector unit 509. The probe signals are transmitted together with the transmission signals through the optical fiber and the power amplifier unit 506 that causes deviations, and hence are input with the same deviations as those with the transmission signals into the probe detector unit 509. Accordingly, control parameters necessary for deviation compensation can be obtained by measuring the phases and amplitudes of the respective probe signals.

As shown by broken lines in FIG. 8, the control parameters obtained by the probe detector unit 509 are returned to the signal processor unit 502 of the center unit 5 through the remote-unit optical interface 505 and the center-unit optical interface 504. The signal processor unit 502 calculates compensation coefficients to be multiplied with the respective transmission signals and compensation amounts for delay times based on the respective control parameters, thereby performing signal processing to cancel the affects of the deviations on the transmission signals.

Generally, a wireless base station uses multiple frequency channels. Accordingly, if an array antenna is employed in the wireless base station, a considerable number of signal transmissions have to be performed between the center unit and the remote unit. This results in increasing in the number of optical fiber paths to be laid between the center unit and the remote unit, whereby reducing the advantage of low cost achieved by the division of the base station into the center unit and the remote unit.

According to any one of the conventional, previously proposed techniques described above, the system configuration is not such that portions of deviations occurring on the multiple transmission signals being transmitted from the center unit to the remote unit are restrictive so as to perform the deviation compensation within those portions in a closed form. More specifically, as shown by the broken lines in FIG. 8, the deviation compensating system is provided across both the center unit and the remote unit in the base station of the conventional configuration, so that means for passing the control parameters generated in the remote unit to the center unit has to be provided.

SUMMARY OF THE INVENTION

In the field of wireless communication for the future, attention is drawn to broadband transmission using orthogonal frequency division multiplexing (OFDM). In a system using OFDM, the frequency of respective radio signals become nonuniform in characteristics because of the broadband, means for compensating for the deviation occurring in each frequency channel becomes important.

An object of the present invention is to reduce, in comparison to conventional apparatuses, the transmission capacity of an optical fiber section interconnecting between a center unit and a remote unit in a wireless base station that employs an array antenna in the remote unit.

Another object of the present invention is to facilitate maintenance operations, such as inspection and adjustment, in the wireless base station configured as described above by localizing a compensating system to compensate for deviations in, for example, phases and amplitudes, occurring across multiple transmission signals.

Still another object of the present invention is to provide a wireless base station that comprises a center unit and a remote unit and is suitable for broadband communication.

The problems with the above-described conventional apparatuses are caused by the fact that the RF signals for the respective antenna elements are created in the center unit and transmitted to the remote unit through the optical fiber.

In general, a feature of a wireless base station according to the present invention resides in that a center unit transmits a transmission signal in a base band state to a remote unit through an optical fiber.

In one aspect, the wireless base station of the invention transmits to the optical fiber the transmission signal and array weight information being time multiplexed before execution of the array processing, thereby enabling circumventing occurrence of signal deviations among antenna elements in an optical fiber section. According to the configuration of the present invention, since a compensation system for the signal deviations among the antenna elements is localized in the remote unit, it is not necessary to feed back control signals for eliminating the deviations from the remote unit to the center unit, as shown by the broken line in FIG. 8. Consequently, the circuit configuration can be simplified.

In another aspect, in the wireless base station of the present invention, the remote unit spatially modulates a base band signal received from the center unit, converts the modulated signal into multiple transmission signals for the respective antenna elements, converts the transmission signals into RF signals and transmits the RF signals from the array antenna. In addition, the remote unit executes addition of probe signals to the respective transmission signals, detection of the probe signals at input terminals of the array antenna, measurement of signal deviations, and compensation process for the transmission signals in accordance with the measurement results. In this case, although the functions required for the remote unit of the present invention are increased in comparison to the conventional apparatuses, the volume of circuit portions to be newly added to the remote unit for processing base band signals can be small in the occupation ratio with respect to the entirety of the remote unit.

In the case of a wireless base station, in which OFDM (orthogonal frequency division multiplexing) signals are transmitted from the center unit to the remote unit, since signal deviations occurring among the antenna elements have frequency characteristics, it is more preferable to carry out compensation (array weight compensation) on transmission signals being supplied to the antenna elements, in units of an appropriate frequency than to uniformly carry out the compensation on all the carriers.

In this type of wireless base station, according to the present invention, OFDM signals generated in the center unit are transmitted to the remote unit via the optical fiber, and array signal processing and IFFT (inverse fast Fourier transform) processing are performed on the side of the remote unit. Before executing the IFFT processing necessary in the OFDM configuration, the remote unit performs the array processing and adds probe signals to the transmission signals in the frequency domain. Detection of the probe signals and compensation for array weights based on the measurement results of deviations are localized in the remote unit.

According to the present invention, since the compensation system for eliminating the deviations is localized in the remote unit, operations such as adjustment and maintenance of the wireless base station are simplified. Further, since the amount of control information to be transmitted from the center unit to the remote unit through the optical fiber is small, the present invention can provide a wireless base station system that enables significant reduction of bandwidth necessary for the optical fiber section and capable of reducing the running costs.

BRIEF DESCRIPTION OF THE DRAWINGS

FIG. 8 is an example configuration of a conventional, previously proposed wireless base station including a center unit and a remote unit.

DETAILED DESCRIPTION OF THE PREFERRED EMBODIMENTS

First Embodiment

Figure 1:
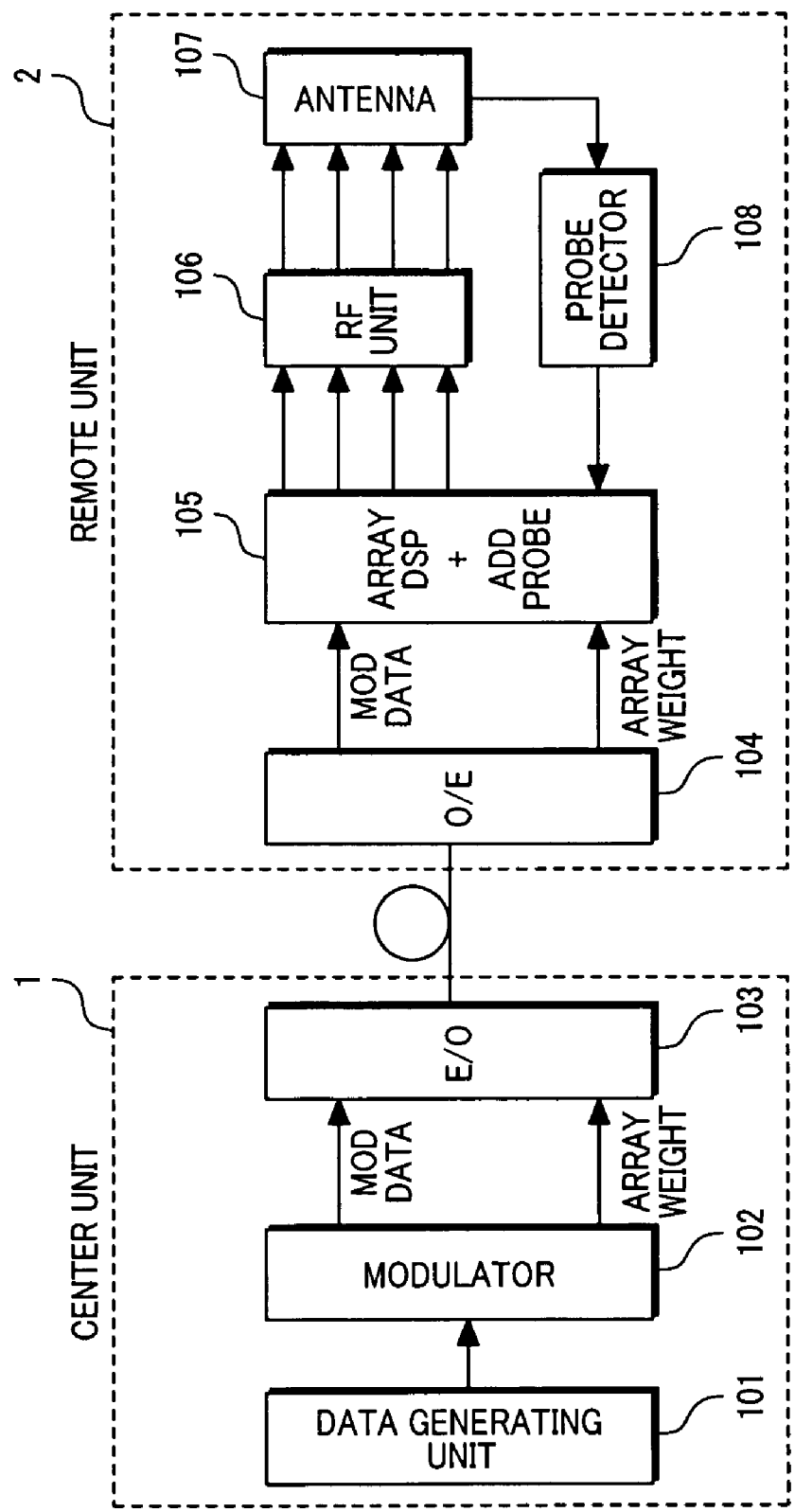
FIG. 1 is a configuration diagram showing a first embodiment of a wireless base station according to the present invention.

FIG. 1 is a configuration diagram showing a first embodiment of a wireless base station according to the present invention.

The base station comprises a center unit 1 and a remote unit 2 that are interconnected by an optical fiber. The base station shown here is used for networks of mobile wireless communication, such as represented by cellular communication. In the case where multiple base stations are requiring service area, multiple remote units 2 can be distributedly located, and multiple center units 1 connected to the remote units 2 can be concentrically located in a specific site. In addition, although not shown in the drawings, the configuration may be such that multiple remote units 2 are connected to a single center unit 1, and the transmission signal is distributed from the same center unit 1 to the respective remote units 2.

The remote unit 2 is a small apparatus that is placed on a building roof, a telegraph pole, or the like, and processes the transmission signal supplied from the center unit 1, amplifies the signal, and transmits the signals in the air through an antenna (array antenna). Although not shown in FIG. 1 for the sake of simplification, in an actual base station, there is provided circuitry devices for an upstream circuit routed in the direction from a mobile terminal to a mobile communication network.

Generally, signals on the upstream circuit are also used for the determination of array weights that are to be multiplied with respective signals for a downstream circuit routed in the direction from the mobile communication network to the mobile terminal. As array weight determination algorithms, many algorithms are known, such as a simple matrix inverse (SMI) algorithm, an least mean square (LMS) and recursive least square algorithms for adaptive control, for example.

The present invention proposes a transmission system for an array antenna type base station provided with a compensation system for correcting a transmission circuit so that array weights determined by an arbitrary algorithm have the desired effect on transmission signals actually supplied to respective antenna elements. As such, no specific limitations are imposed on the array weight determination algorithm, and detailed descriptions are omitted herefrom regarding an array weight determination method and upstream signals necessary for the method.

The center unit 1 comprises a data generating unit 101, a base band modulator 102, and a center-unit transmission line interface 103.

The data generating unit 101 outputs user data to be transmitted to the mobile terminal. In the mobile communication network, the center unit 1 receives transmission data for the respective mobile terminal from a wired network. In this case, a buffer for temporarily storing the transmission data received from the network corresponds to the data generating unit 101.

The data generating unit 101 outputs the transmission data to the base band modulator 102 in synchronism with a transmission timing. Ordinarily, the transmission timing is supplied from a packet scheduler (not shown in FIG. 1). The packet scheduler determines a packet to be transmitted based on control parameters, such as wireless links status and packet transmission priority level.

The base band modulator 102 executes coding for communication path with, for example, a convolution code, turbo code or a low density parity check code (LDPC), anti-fading measures such as interleaving and repetition, and modulation such as a quadrature phase shift keying (QPSK) modulation and a sixteen quadrature amplitude modulation (16 QAM). Thereby, the base band modulator 102 converts the transmission data into a base-band modulated transmission signal (MOD Data). In addition, the base band modulator 102 determines array weights, and outputs the determined array weights in parallel with the modulated transmission signal (MOD Data).

The base band modulator 102 performs the above conversion from the transmission data supplied from the data generating unit 101 into the modulated transmission signal (MOD Data) after adding to the transmission data various types of information such as control information necessary for receiving signals from the mobile terminal, for example, information necessary for receiving a pilot signal and the like, and control information of the MAC layer, such as upstream power control information, for example. The array weights may be calculated in accordance with a conventionally known method, such as the SMI method, a method using a feedback signal from the mobile terminal, or a method for generating semi-permanent beams.

The center-unit transmission line interface 103 multiplexes, in time division, the modulated transmission signal (MOD Data) and the array weights output from the base band modulator 102. Thereafter, the interface 103 performs electric-optical (E/O) conversion on the multiplexed signal and outputs the resultant optical signal to the optical fiber. The time multiplexing has two types: one is multiplexing of the same-channel signals, and the other is multiplexing of multichannel signals. The present embodiment uses multiplexing of same channel signals as a default and uses the latter as an option.

Figure 6:
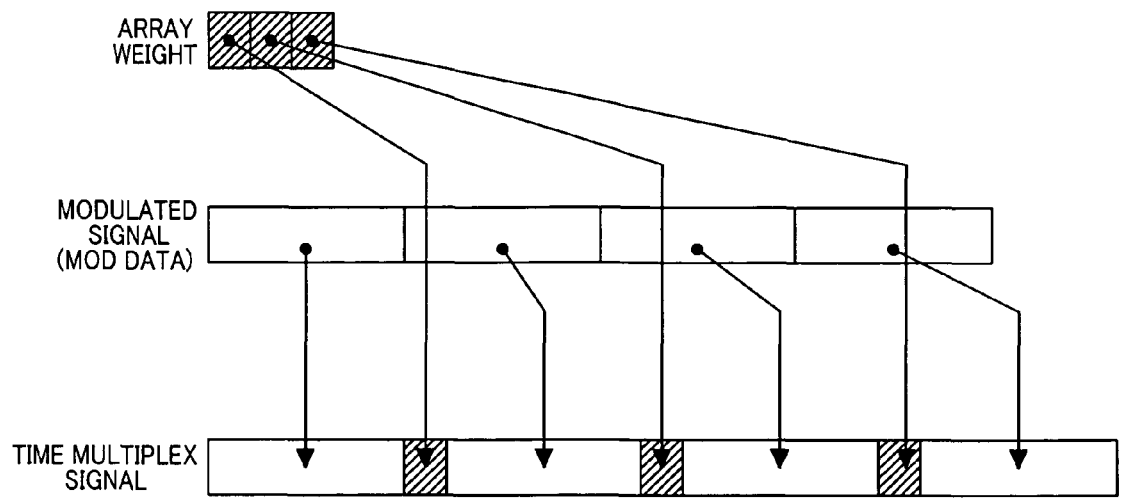
FIG. 6 is a diagram showing one example of a multiplexing method for array weights and a modulated signal.

As shown in FIG. 6, in the default multiplexing of same-channel signals, the modulated transmission signal (MOD Data) and the array weight output from the base band modulator 102 are time division multiplexed. By multiplexing two kinds of signals in this manner, the amount of transmission information can be reduced in comparison to the case where the multiple transmission signals created for the respective antenna elements are transmitted in parallel as shown in FIG. 8.

A case is now assumed in which, for example, 16-bit information is transmitted as the respective I, Q signals. If the array antenna comprising 12 elements, according to the conventional configuration shown in FIG. 8, information in the amount of 16 bits×2 (I and Q signals)×12 (the number of antenna elements) has to be transmitted from the center unit to the remote unit. However, according to the present embodiment, the task can be achieved by transmitting modulated transmission signals (16 bits×2) before execution of the array processing, and an array weight ($\alpha$). The amount of the information $\alpha$ is dependent on an array weight update cycle. Ordinarily, since the weight update cycle is in a range of from several tens of milliseconds to 100 milliseconds, the amount of transmission information of the array weight $\alpha$ takes a negligible small value in comparison to the amount of data to be transmitted as the modulated signal.

In the case of packet type communication performed by changing beams with a short frame length for each packet, the array weights for each user are updated at a relatively slow temp as described above. However, since the array weights to be applied for the respective frame (packet) are changed depending on the frame destination, the center unit 1 has to transmit array weight information corresponding to the frame (packet) to the remote unit 2. In this case, the overhead is increased if the array weight information is transmitted for each frame (packet).

In order to reduce the aforementioned overhead, the process and configuration may preferably be arranged, for example, as follows. A memory for storing array weights for each user is provided in the remote unit 2, and new array weight information to be stored in the memory is transmitted from the center unit 1 to the remote unit 2 when array weights for a user are updated. When transmitting a packet, only an identification number of array weights to be applied is specified in a header of the transmission packet. The remote unit 2 read out the array weights specified by the identification number from the memory and applies them for the transmission of the packet, thereby to obviate the necessity for the transmission of the array weights for every packet.

According to the optional multiplexing of multichannel signals, in the event of transmission of multichannel signals with carriers different from one another, the multichannel signals are time multiplexed and transmitted from the center unit 1 to the remote unit 2 through the optical fiber. According to the conventional techniques, since the transmission data is converted into the RF signals corresponding to the respective antenna elements and the RF signals are transmitted through the optical fiber, the bandwidth necessary for the optical fiber section is N times the carrier frequency unit.

According to the present embodiment, however, since the transmission data is transmitted through the optical fiber within the base band zone, the necessary bandwidth is at most the base band signal zone, and the total bandwidth does not so increase even after the time multiplexing of the plurality of channel signals. Accordingly, even in the case of the multiplexing of the multichannel signals, the number of optical fiber connections can be reduced compared to what was conventionally required.

The remote unit 2 comprises a remote-unit optical interface 104, a signal processor unit 105 (array processor unit) 105, an RF unit 106, an array antenna 107, and a probe detector unit 108.

The remote-unit optical interface 104 converts the optical signal received from the optical fiber into an electric signal, and demultiplexes the time-multiplexed signal. Thereby, in the multiplexing of same-channel signals, a modulated transmission signal (MOD Data) and array weights are output from the remote-unit optical interface 104.

Figure 7:
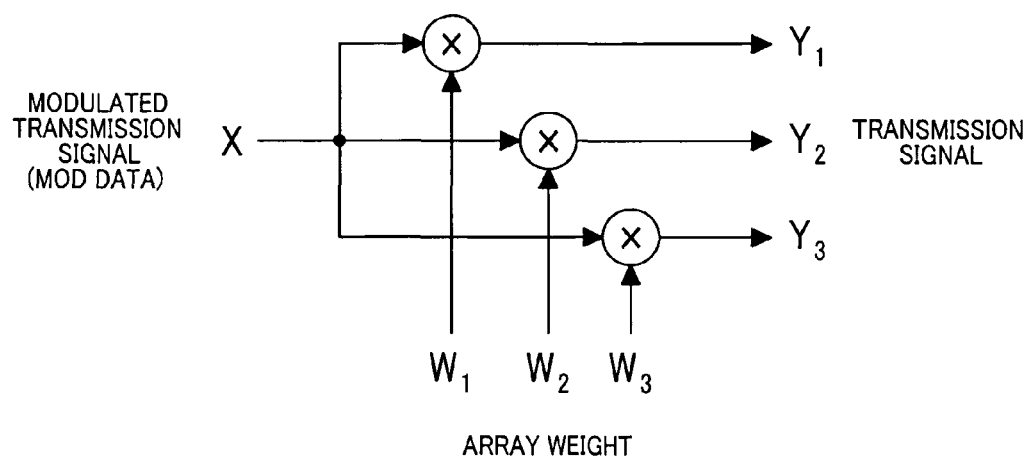
FIG. 7 is a diagram showing one example of a space modulating method for transmission signals to which array weights are applied.

By applying the array weights, the array processor unit 105 executes the space modulation processing on the transmission signal output from the remote-unit optical interface 104. As shown in FIG. 7, in the space modulation processing, complex multiplication is carried out between a transmission signal X and array weights W (W1, W2, W3, . . . ), thereby to generate transmission signals Y (Y1, Y2, Y3, . . . ) for each antenna element.

Relative phase and amplitude compensation has to be performed on each of transmission signals corresponding to the antenna elements that are output in parallel from the array processor unit 105. Thus, the array processor unit 105 adds a low-power probe signal to each of the transmission signals generated for the antenna element by the space modulation processing. The probe signal is a code sequence discriminatable from the transmission signal.

As will be described later, by detecting amplitude variations and phase variations in the probe signals to be supplied to the array antenna 107 by the probe detector unit 108, amplitude variations and phase variations affected, between the array processing unit 105 and the array antennas 107, on the transmission signals associated with the probe signals can be detected. From measurements of probe signals at antenna terminals or endpoints of signal paths, amplitudes and phases slightly different from one another depending on the antenna element are detected.

The probe signal, which is the specific code sequence, can be detected by, for example, a correlator or a matched filter. The code sequence to be transmitted as the probe signal is rendered to have a sufficient length so that the signal power can be securely detected even when it is low. As a method for adding the probe signals to the transmission signals, there are (1) time division, (2) code multiplexing, and (3) frequency multiplexing, described as follows. In the present invention, one of these methods or a combination of arbitrary two of the methods may be employed.

(1) Time Division:

In the time division, the transmission signal to be the addition target of the probe signal is changed time-wise. In this case, a probe signal of the same specific code sequence is applicable to a plurality of transmission signals. For example, at time period T1, the probe signal is added only to a transmission signal for an antenna element #1, and no probe signal is added to transmission signals for other antennas. At time period T2, the probe signal is added only to a transmission signal for an antenna element #2. In this manner, by changing the transmission signals to be the addition target of the probe signal one after another, it is able to prevent interference among the probe signals and to enable the probe detector unit 108 to discretely detect the probe signal from the transmission signals for the respective antenna elements.

(2) Code Multiplexing:

In the code multiplexing, probe signals different from one another in the code sequence depending on the antenna elements are applied. A plurality of different probe signals added to the transmission signals for the respective antenna elements are mixedly input into the probe detector unit 108. The probe detector unit 108 can discretely detect the respective probe signals by synchronizing the correlator with the respective code sequences.

(3) Frequency Multiplexing:

The frequency multiplexing transmits the probe signal divided into a plurality of frequency domains. The frequency multiplexing is applied, particularly, to a system that transmits a signal through frequency division, similarly as in OFDM.

For the sake of simplification, it is assumed a case where a fast Fourier transform (FFT) of two frequencies is used. In this case, at time period T1, a probe signal for the antenna element #1 is transmitted with a frequency f1, and a probe signal for the antenna element #2 is transmitted with a frequency f2. Conversely, at subsequent time period T2, the probe signal for the antenna element #1 is transmitted with the frequency f2, and the probe signal for the antenna element #1 is transmitted with the frequency f1. By transmitting the probe signals in the frequency division manner, the probe signals for respective antenna elements can be discretely detected by using a probe detector that performs frequency hopping in synchronism with the transmission side, similarly as in the case of the code multiplexing method.

The RF unit 106 up-converts, from the base band signal to RF signals, the multiple transmission signals for the respective antenna elements having been output from the array processor unit 105, and power-amplifies the respective RF signals.

The array antenna 107 works as an interface for transmitting in the airspace the RF transmission signals power-amplified by the RF unit 106. However, parts of the transmission signals are took out by one or more electromagnetic elements weak-coupled to either the respective antenna elements or a signal feed cable to input into the probe detector unit 108. For example, by disposing a detection antenna element or a microstrip resonator, which resonates near the transmission frequency, adjacent to the array antenna 107, it is able to supply the part of the transmission signals to the probe detector unit 108 through electromagnetic coupling.

The probe detector 108 detects the probe signals by a method corresponding to the probe signal adding method adopted in the array processor unit 105, and measures the phases and amplitudes. For example, in the case of the probe signal added by the time division (1), probe detector means for averaging the received signal in synchronism with the probe signal is used for each antenna element. A probe detector means for the antenna element #1 receives the signal in synchronism with the transmission timing of the probe signal for the antenna element #1, and performs correlation operation on an encoder output synchronized with the probe signal (code sequence) to detect the intensity and the phase of the correlation output. By obtaining a time average of the correlation outputs if necessary, phase variations and amplitude variations of a probe signal added to a transmission signal for a specific antenna element can be observed.

For instance, a case is assumed in which the array antenna 107 comprises four antenna elements, and phase rotations of probe signals corresponding to the antenna elements are 10, 10, 100, and 10 degrees, respectively. In this case, only the third antenna element indicates the phase rotation 90 degrees greater than the others, so that phase compensation has to be given to the transmission signal for the third antenna element.

Compensation information obtained by the probe detector 108 is input to the array processor unit 105. Based on the compensation information supplied from the probe detector 108, the array processor unit 105 performs a compensation processing for the phase rotations or amplitude deviations on the transmission signals corresponding to the respective antenna elements.

For example, in the above exemplified case, the array processor unit 105 provides the phase rotations of 0, 0, −90, and 0 degrees to the transmission signals for the antenna elements #1, #2, #3, and #4, respectively, thereby to control the respective phase rotations at input terminals of the array antenna 107 to be 10, 10, 10, and 10 degrees.

Depending on the coupling relationship between the array antenna and the weak-coupled electromagnetic elements, fixed offsets can occur in the phase and amplitude measurement results. In this case, preferably, fixed offset values by antenna element are previously measured and stored into the probe detector 108, and measurement results of phase rotations obtained in association with the detection of the probe signals may be compensated for by using the offset values. For example, a case is assumed in which the phase rotations (phase offset values) among the antenna elements #1, #2, #3, and #4 and probe detecting terminals, which were measured during the antenna manufacture, are 10, −10, 70, and 50 degrees, respectively. In this case, if the measurement results of phase rotations are 10, 10, 100, and 10 degrees, actual phase deviations are determined to be 0, 20, 30, and −40 degrees, respectively, as the differences from the offset values. Compensation for the measurement values may be performed in the array processor unit 105 instead of the probe detector 108.

According to the present embodiment, since the base band signal (digital signal) common to the respective antenna elements is transmitted from the center unit 1 to the remote unit 2, the amount of transmission information in the optical fiber section is significantly reduced. In the present embodiment, deviations across the transmission signals separated by antenna element occur only in the remote unit 2. Accordingly, the control system necessary for the deviation compensation is localized in the remote unit 2, and the inspection, adjustment, and maintenance are facilitated. In addition, since the amount of transmission information in the optical fiber section is small, designing of circuit becomes easy, and the running costs related to link-usage charges for users can be reduced.

Second Embodiment

Figure 2:
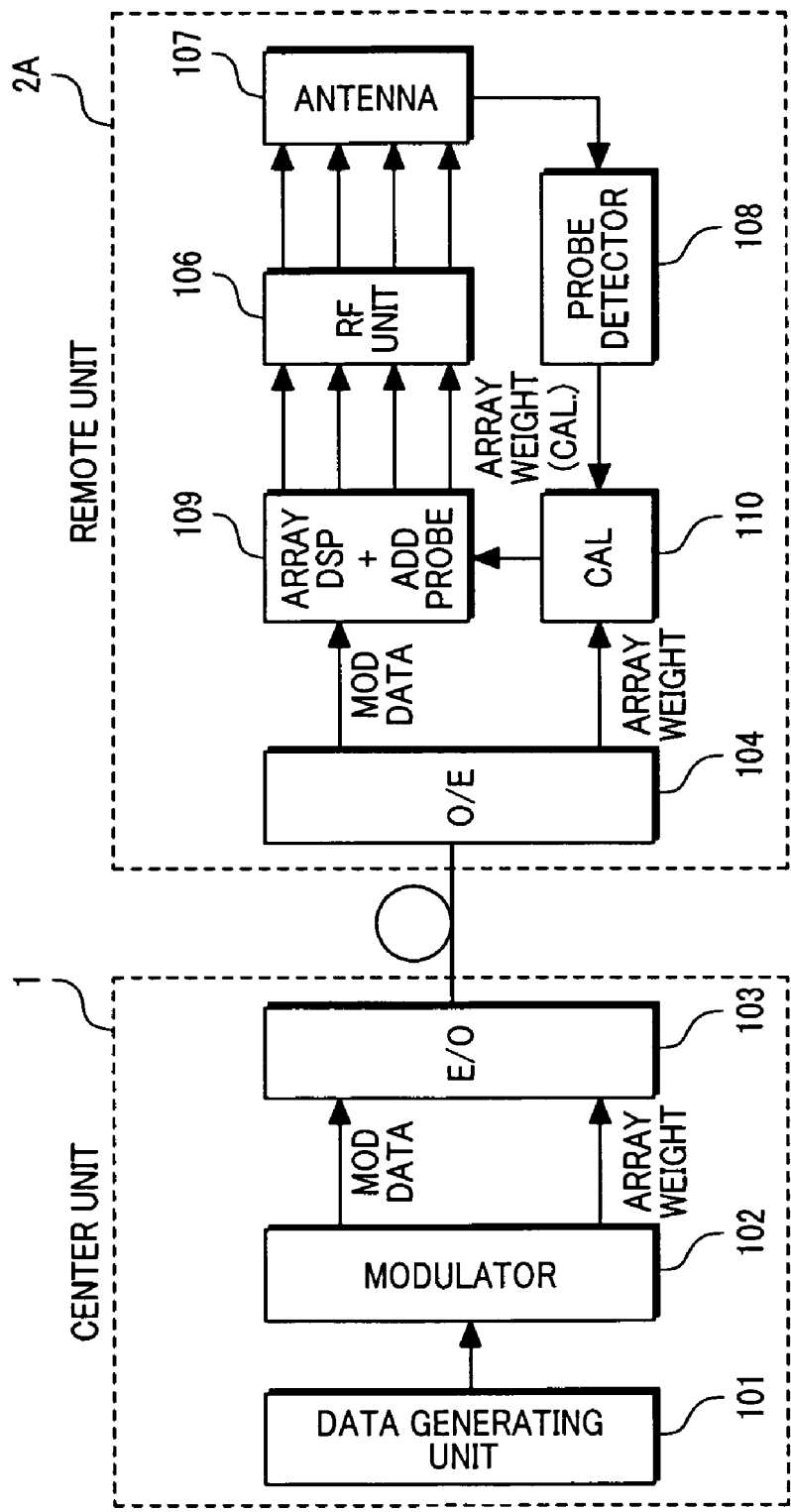
FIG. 2 is a configuration diagram showing a second embodiment of a wireless base station according to the present invention.

FIG. 2 is a configuration diagram showing a second embodiment of a wireless base station according to the present invention. The second embodiment is different from the first embodiment in the configuration of the remote unit.

In the present embodiment, the array processor unit 105 shown in FIG. 1 is divided into an array processor unit 109 for processing modulated transmission signal (MOD data) and a weight compensation unit 110 for compensating for array weights based on the output information from the probe detector 108.

The weight compensation unit 110 stores array weights output from the remote-unit optical interface 104 into a memory. The weight compensation unit 110 generates complex vector information for compensating for the phase or amplitude of an output signal from a specific antenna element based on output information from the remote-unit optical interface 104, and performs the multiplication between the array weights stored in the memory and the complex vector information, thereby to compensate the array weights. The compensated array weights are supplied to the array processor unit 109.

For the purposes of simplification, a case of compensation only for the phases will be described hereinbelow. A case is assumed in which phase components of array weights for the antenna elements #1, #2, #3, and #4 are 10, 20, 30, and 40 degrees, respectively, and compensation values are 0, 0, −90, and 0 degrees, respectively. In this case, as compensated array weights, the weight compensation unit 110 outputs 10, 20, −60, and 40 degrees to the array processor unit 109.

By applying the compensated array weights, the array processor unit 109 executes the space modulation processing, shown in FIG. 7, on the transmission signal output from the remote-unit optical interface 104, thereby to generate transmission signals Y (Y1, Y2, Y3, . . . ) by antenna element. Respective low-power probe signals are added to the generated transmission signals. In this case, similarly as in the first embodiment, the probe signals are added in accordance with, for example, the methods of (1) time division, (2) code multiplexing, and (3) frequency multiplexing.

The operation will be described in comparison to the previous example. According to the previous example, the array processor unit 105 operates in the following sequence. (1) Performs space modulation on the transmission signals by applying the array weights received from the center unit, (2) performs compensation for the phases/amplitudes by applying the complex vectors to the space modulated transmission signals by antenna element, and (3) add the probe signals to the transmission signals. On the other hand, according to the second embodiment, the array processor unit 109 operates in the following sequence. (1) Perform space modulation on the transmission signals by using the compensated array weights, and then (2) add the probe signals to the transmission signals. In either of the cases, since the linear operation process is executed, the same output signals can be finally obtained.

Third Embodiment

Figure 3:
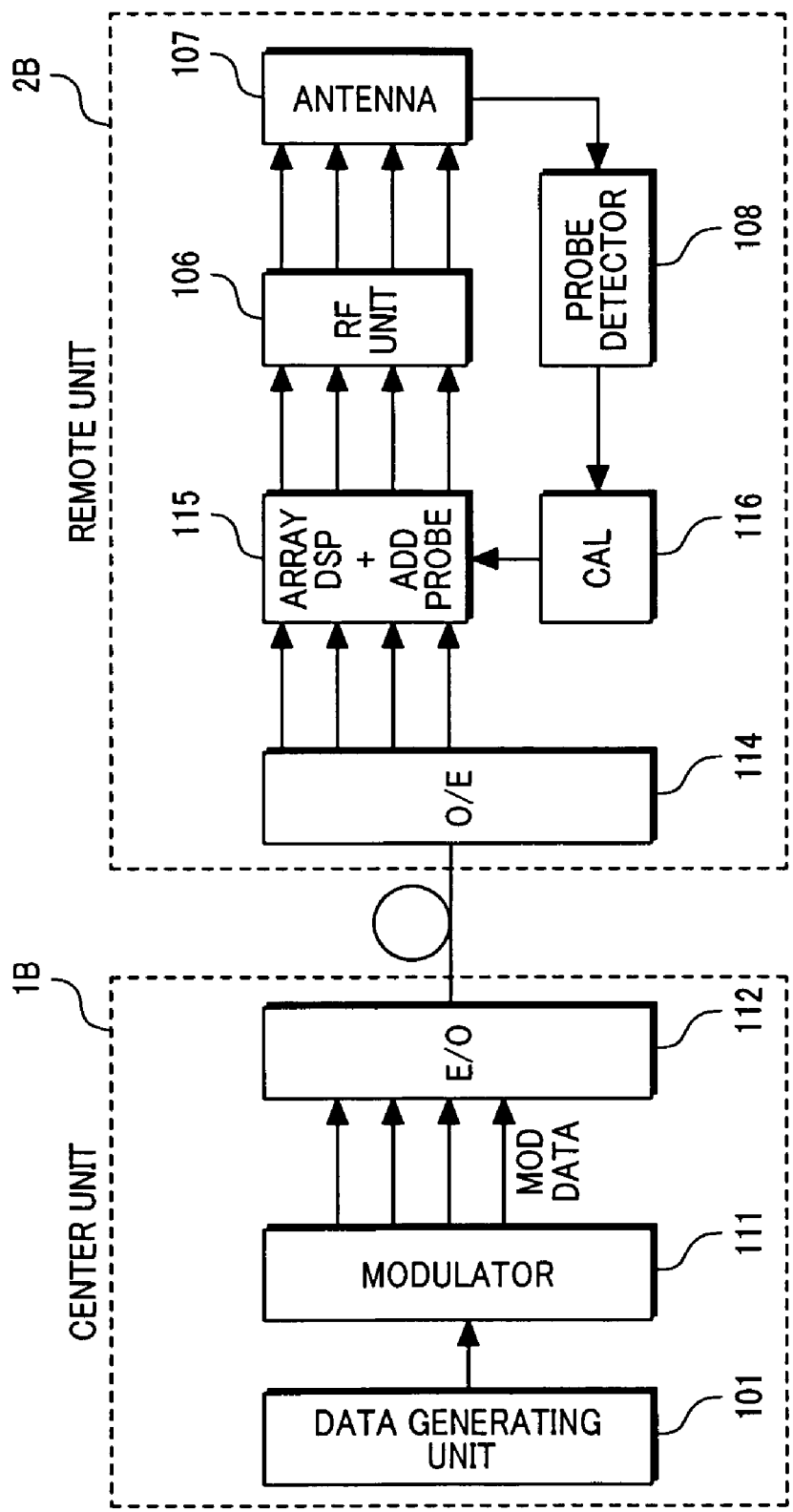
FIG. 3 is a configuration diagram showing a third embodiment of a wireless base station according to the present invention.

As a third embodiment according to the present invention, FIG. 3 shows a configuration diagram of a wireless base station employing a multi-input multi-output (MIMO) technique.

In the MIMO type wireless base station, the streams of transmission signals are different from one another for the respective antenna elements. Therefore, plural streams of transmission signals corresponding to the respective antenna elements have to be generated when the base band modulation has been performed in a center unit 1B. For this reason, in the case of MIMO type wireless base station, different from the case of the first and second embodiment, the center unit 1B cannot transmit a base band signal common to the plurality of antenna elements to the remote unit 2 through the optical fiber.

In the MIMO type wireless base station has a problem to be solved particularly when level deviations occurred across transmission signals, such that compensation has to be performed to attain equalization of the levels of the transmission signals to be supplied to the antenna elements. In this case, the equalization means that when a base band modem has performed control to equalize transmission signal powers for the multiple antenna elements, the transmission signal powers actually output from the respective antenna elements are equalized. In addition, in the case where the level of a transmission signal for a specific one of the antenna elements is intentionally increased by the modem to be higher than transmission signals for the other antenna elements depending on the condition of the communication path in the radio area, the equalization means that the intended difference in the signal levels is maintained.

In the wireless base station shown in FIG. 3, the center unit 1B comprises a data generating unit 101, a base band modulator 111, and a center-unit transmission line interface 112.

In the first embodiment, the base band modulator 102 outputs one modulated transmission signal (MOD data), which is common to the respective antenna elements, and array weights. However, the base band modulator 111 of the third embodiment generates multiple streams of modulated transmission signals (modem signals) corresponding to the number of the antenna elements. These modem signals carry information items different from one another. As methods for generating MIMO signals, STBC (space-time block-code) and BLAST (Bell Laboratories Layered Space Time) schemes are well known.

The modem signals generated by the base band modulator 111 are time multiplexed (parallel-serial converted) by the center-unit transmission line interface 112. The time-multiplexed signal is converted into an optical signal, and transmitted to the optical fiber. In this case, since the signal being transmitted through the optical fiber is the base band signal, the necessary bandwidth can be narrowed and the transmission efficiency becomes high in comparison to the conventional case of RF signal transmission. In addition, since the base band signal is serially transmitted with time division multiplexing in the optical fiber section, problems such as phase offsets and amplitude deviations do not occur during the transmission.

A remote unit 2B comprises a remote-unit transmission line interface 114, an array processor unit 115, an RF unit 106, an array antenna 107, a probe detector 108, and a calibration processor unit 116.

The remote-unit transmission line interface 114 converts the optical signal output from the optical fiber into electric signal, and converts the time division multiplexed base band signal into the multiple transmission signals same as the outputs from the base band modulator 111 through serial-parallel conversion, thereby to supply the multiple signals to the array processor unit 115.

As will be described later, in the array processor unit 115, by applying complex vectors for use in compensation for transmission signals corresponding to the respective antenna elements, which are created by the calibration processor unit 116, the transmission signals supplied from the remote-unit transmission line interface 114 are compensated for, and signal level deviations among the transmission signals at the antenna input terminals are eliminated. In addition, the array processor unit 115 adds probe signals to the respective compensated transmission signals, and outputs the transmission signals to the RF unit 106. Similarly as in the first embodiment, the method of adding the probe signals may be any one of (1) time division, (2) code multiplexing, and (3) frequency multiplexing.

The RF unit 106 converts the respective transmission signals added with the probe signals to RF signals, amplifies the power of the RF signals, and outputs the RF signals to the array antenna 107. Similarly as in the first embodiment, parts of the transmission signals input to the antenna 107 are branched into the probe detector 108 through electromagnetic elements. The probe detector 108 detects the probe signals and measures the phases and amplitudes thereof. Based on the measurement results, the calibration processor unit 116 generates the complex vectors for use in compensation for amplitude deviations.

For example, a case is now assumed in which the measurement values of the amplitude deviations of the probe signals input to the four antenna elements #1, #2, #3, and #4 of the array antenna 107 are 1.0, 1.6, 1.6, and 2.0, respectively. In this case, if phase deviations do not exist, the complex vectors for use in amplitude compensation generated by the calibration processor unit 116 are 1.0, 0.625, 0.625, and 0.5, respectively.

Depending on the coupling relationship between the array antenna and the electromagnetic element, fixed offsets can occur in the phases and amplitudes measured by the probe detector 108. These fixed offset values can be measured previously during the antenna manufacture. Similarly as in the first embodiment, it is preferable to prestore the measurement results in a memory of the probe detector 108 so that the probe detector 108 can compensate for the measurement values of the phases and the amplitudes based on the offset-values.

For example, a case is assumed in which amplitude deviations (A) of the antenna elements #1, #2, #3, and #4, which were measured during the antenna manufacture, are 1.0, 1.6, 1.0, and 1.0, respectively, and amplitude deviations (B) of the probe signals, which were measured by the probe detector 108 are 1.0, 1.6, 1.6, and 2.0, respectively. In this case, actual amplitude deviations are, respectively, 1.0, 1.0, 1.6, and 2.0 indicated by B/A. In this case, the calibration processor unit 116 generates 1.0, 1.0, 0.625, and 0.5 as compensation-dedicated complex vectors corresponding to the antenna elements #1, #2, #3, and #4, respectively.

According to the present embodiment, since whole the calibration system is concentrically disposed on the side of the remote unit 2, the maintenance operation can be simplified by being localized on the remote unit side.

Fourth Embodiment

Figure 4:
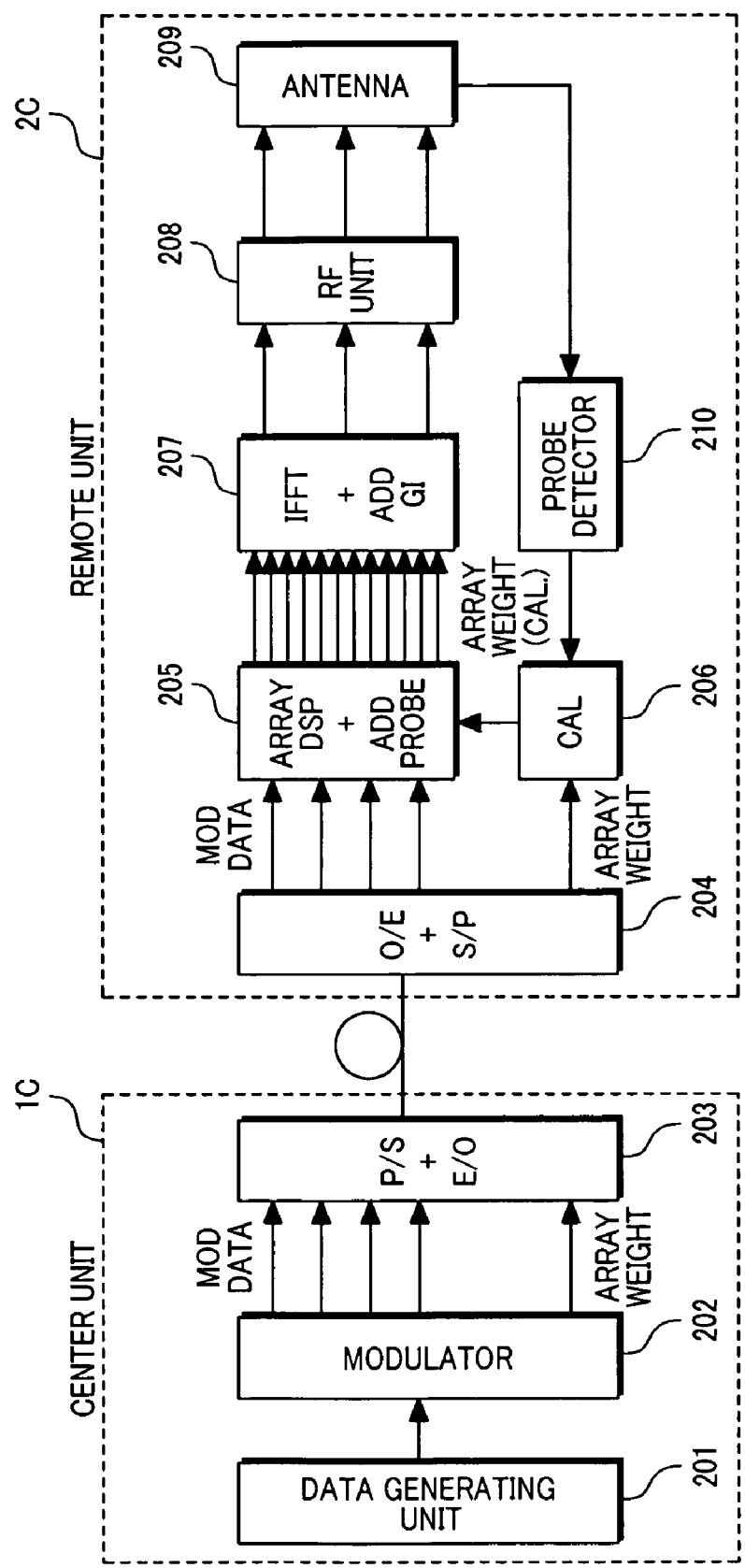
FIG. 4 is a configuration diagram showing a fourth embodiment of a wireless base station according to the present invention.

As a fourth embodiment according to the present invention, FIG. 4 shows a configuration diagram of an OFDM (orthogonal frequency division multiplexing) type wireless base station.

A center unit 1C of the fourth embodiment comprises a data generating unit 201, a base band modulator 202, and a center-unit transmission line interface 203.

For transmission data output from the data generating unit 201, the base band modulator 202 executes propagation-path dedicated coding with, for example, a convolution code, Turbo code, or LDPC code, anti-fading measures such as interleaving and repetition, channel distribution for distributing signals to multiple frequency channels, and coding with, for example, quadrature phase shift keying (QPSK) and sixteen quadrature amplitude modulation (16 QAM), thereby to generate multiple OFDM transmission signals different from one another in frequency domain (frequency channel). In addition, the base band modulator 202 generates array weights, and outputs them with the multiple OFDM transmission signals to the center-unit transmission line interface 203.

The center-unit transmission line interface 203 time multiplexes the OFDM transmission signals and the array weights according to parallel-serial conversion, converts the time-Multiplexed serial information into an optical signal, and outputs the optical signal to the optical fiber.

In this embodiment, since the signal being transmitted through the optical fiber is the broadband signal, the array weights may have frequency characteristics. The array weights are generated for each of the frequency channels, and the center unit 1C collectively transmits the multiple array weights. The center unit 1C does not have to repeatedly transmit the array weights corresponding to the respective frequency channels. Further, rather than transmitting the multiple transmission signals which have been multiplied by the respective array weights and correspond to the antenna elements, the center unit 1C is preferable to collectively transmit to a remote unit 2C the array weights having the time-wise and frequency-wise correlations. By storing the array weights in a memory of the remote unit 2C, the amount of transmission data can be significantly reduced.

Since the array weights are very slow in the update cycle in comparison to the data transmission rate, same array weights are applicable to transmission data in a time period for the same user. The above-mentioned array weights having time-wise correlation refer to the array weights thus having the commonality on the time axis. The above-mentioned frequency-wise correlation refers to the case where it is sufficiently small in the form of a fractional band and the difference in the frequency characteristics of the array weights between adjacent frequency channels are sufficiently small. In this case, transmission using the same array weight to the adjacent frequency channels is possible.

The remote unit 2C comprises a remote-unit transmission line interface 204, an array processor unit 205, a calibration processor unit 206, an OFDM termination unit 207, an RF unit 208, an antenna 209, and a probe detector 210.

The signal received from the optical fiber is converted into an electric signal and output from the remote-unit transmission line interface 204 after separated into array weights and transmission signals for each frequency channel through a serial-parallel conversion.

By applying compensated array weights supplied from the calibration processor unit 206, the array processor unit 205 converts the per-frequency-channel transmission signals received from the center unit 1C into time-frequency two-dimensional transmission signals. In the case where the array weights and the compensation information have frequency characteristics, compensated array weights corresponding to respective frequency bands are output from the calibration processor unit 206. In this case, the array processor unit 205 multiplies the transmission signals of the respective frequency channels received from the center unit 1C by the compensated weights corresponding to respective frequency bands.

The array processor unit 205 generates low-power probe signals discriminatable from the transmission signals, and adds the probe signals to the transmission signals of the respective frequency channels. As already described, the probe signals are added to the transmission signals in accordance with any one of the methods of time division, code multiplexing, and frequency multiplexing. When using the frequency multiplexing, it may preferably be that, for adjacent frequency channel shaving high correlation, the probe signal is added to frequency channels corresponding to different antenna elements, and for a frequency channel to which no probe signal has been transmitted, the state of the probe signal is predicted by performing interpolation processing.

The OFDM termination unit 207 applies IFFT (inverse fast Fourier transform) operations to the signals in the frequency domain for each antenna element, thereby to transform the signals into signals in the time domain. In addition, the OFDM termination unit 207 inserts, into the respective converted signals, guard intervals that are known as preventive measure against delay spread, and outputs the resultant signals as OFDM time domain signals.

The RF unit 208 converts the output signals of the OFDM terminal unit 207 into RF signals, amplifies the power of the RF signals, and supplies the RF signals to the antenna 209. Parts of the RF signals input to the antenna 209 are branched into the probe detector 210 through an electromagnetic element. By using a method corresponding to the probe signal addition employed in the array processor unit 205, the probe detector 210 extracts the probe signals and measures the phases and amplitudes thereof. In the event of occurrence of fixed offsets in the measurement results, the measurement results are corrected in accordance with fixed offset values prestored in the memory, as described above.

In the present embodiment, since the probe signals are added to the respective OFDM frequency channels, the probe detector 210 separates the received signal into the respective frequency channels by performing FFT processing. After that, the probe detector 210 extracts probe signals having a specific pattern from the signals transformed into the frequency domain by using a correlator. Based on the measurement results of the respective frequency channels, the probe detector 210 obtains frequency characteristics of transmission signal deviations among the antenna elements.

From the frequency characteristics of the transmission signal deviations among the antenna elements obtained by the probe detector 210, the calibration processor unit 206 obtains complex vectors corresponding to reverse characteristics of the frequency characteristics. The calibration processor unit 206 generates compensated array weights by multiplying the array weights having been received from the center unit by the complex vectors, and supplies the compensated array weights to the array processor unit 205. If the array weights received from the center unit have the frequency characteristics, they are different for each frequency channel.

According to the present embodiment, since the compensation system is localized in the remote unit 2C of the wireless base station in which the OFDM signals are transmitted from the center unit 1C to the remote unit 2C, the maintenance operation can be facilitated, and the amount of transmission information in the optical fiber section can be reduced.

Fifth Embodiment

Figure 5:
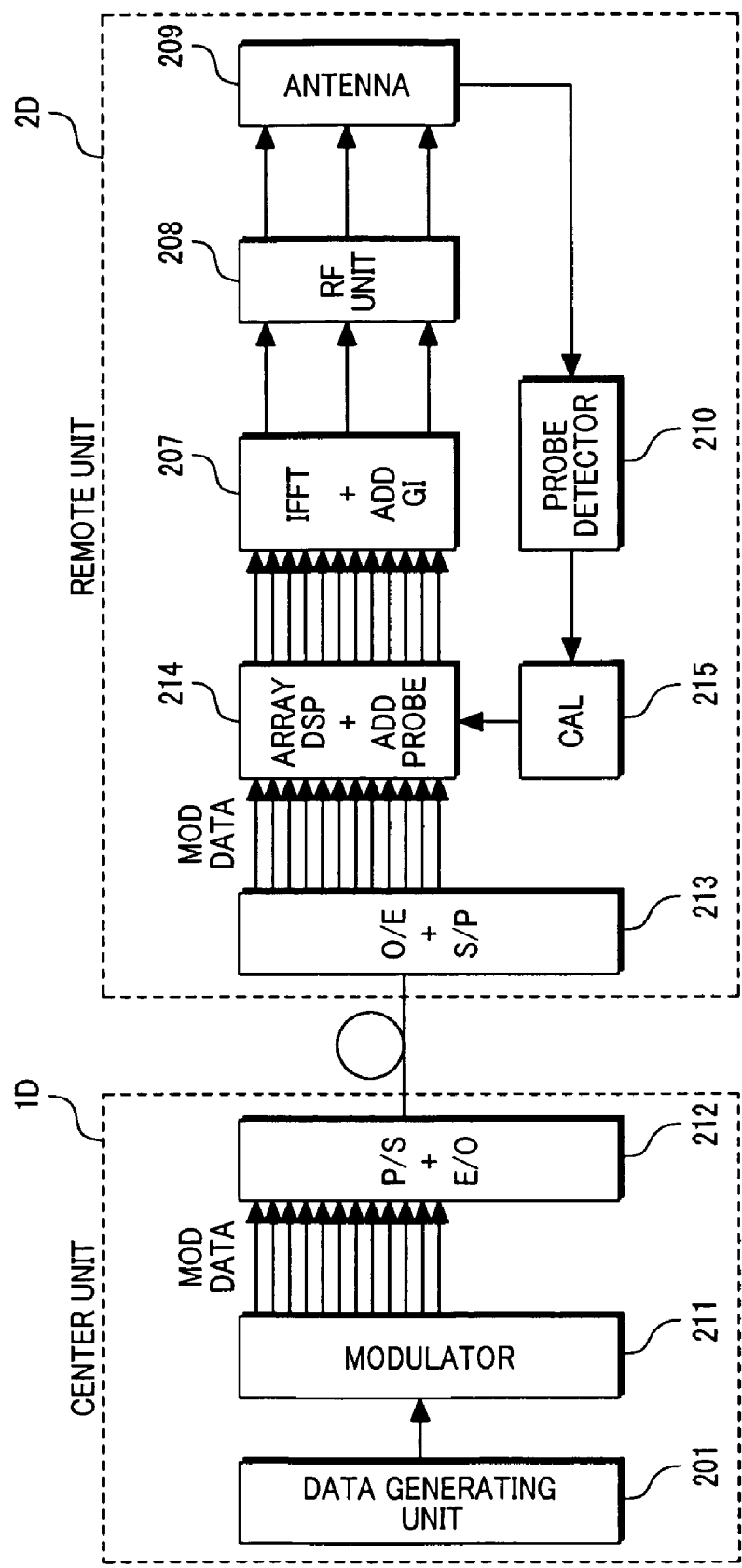
FIG. 5 is a configuration diagram showing a fifth embodiment of a wireless base station according to the present invention.

As a fifth embodiment according to the present invention, FIG. 5 shows a configuration diagram of a MIMO-OFDM type wireless base station.

In the present embodiment, for conformity to both MIMO and OFDM schemes, a center unit 1D generates two-dimensional transmission signals different for each frequency domain and for each antenna element. The former signals will be referred to per-frequency-domain transmission signals and the latter to per-antenna-element transmission signals, hereafter.

The center unit 1D comprises a data generating unit 201, a base band modulator 211, and a center-unit transmission line interface 212. A difference from the fourth embodiment is that the base band modulator 211 generates two-dimensional transmission signals different for each frequency domain and for each antenna element. However, a feature of the present embodiment resides in that a remote unit 2D that receives the two-dimensional base band transmission signals generated by the base band modulator 211 is provided with a compensation function of optimizing the relative phases and relative amplitudes among the antenna elements. Accordingly, the present embodiment has no specific limitations on a generating method of the two-dimensional transmission signals in the base band modulator 211. For this reason, a detailed description regarding the generating method of the two-dimensional transmission signals in the base band modulator 211 will be omitted here.

The center-unit transmission line interface 212 converts multiple parallel signals, which are output from the base band modulator 211 and different for each frequency and for each antenna element, into a time-multiplexed serial signal, converts the serial signal into an optical signal, and transmits the optical signal to the optical fiber. Since the two-dimensional modem signals are transmitted as the base band signals to the optical fiber, the necessary bandwidth can be narrowed and the transmission efficiency becomes high, in comparison to conventional wireless base stations that transmit the RF signals in the optical fiber section. Further, since the base band signals are transmitted in the form of the time multiplexed serial signal in the optical fiber section, there is no risk of occurrence of phase offset and amplitude deviations during the transmission.

The remote unit 2D of the present embodiment comprises a remote-unit transmission line interface 213, an array processor unit 214, an OFDM termination unit 207, an RF unit 208, an antenna 209, a probe detector 210, and a calibration processor unit 215.

The remote-unit transmission line interface 213 converts the signal received from the optical fiber into an electric signal, and separates the electric signal into per-antenna-element and per-frequency two-dimensional transmission signal streams by performing serial-parallel conversion.

By applying compensation-dedicated complex vectors, which are generated by the calibration processor unit 215 as will be described later, to the per-antenna-element and per-frequency two-dimensional transmission signal streams generated by the calibration processor unit 215, the array processor unit 214 performs a compensation processing to eliminate signal level deviations among the antenna elements. Further, the array processor unit 214 generates probe signals for measuring signal level deviations among the antenna elements, and adds the probe signals to the compensated transmission signals. As already described in conjunction with the first to third embodiments, the probe signals may be added in accordance with any one of the methods of time division, code multiplexing, and frequency multiplexing.

The multiple transmission signals including the probe signals output from the array processor unit 214 are supplied to the antenna 209 via the OFDM terminal unit 207 and the RF unit 208. Similarly as in the fourth embodiment, parts of the transmission signal input to the antenna 209 are branched into the probe detector 210 through an electromagnetic element. By using a method corresponding to the probe signal addition employed in the array processor unit 214, the probe detector 210 detects the probe signals and measures the phases and amplitudes thereof.

In accordance with the measurement results of the probe detector 210, the calibration processor unit 215 generates the complex vectors for compensating for phase deviations and amplitude deviations in the antenna 209, and outputs the vectors to the array processor unit 214. Similarly as in the fourth embodiment, the complex vectors have reverse characteristics with respect to the outputs of the probe detector 210.

According to the present embodiment, even when the MIMO-OFDM is adopted as the communication scheme, by localizing in the remote unit 2D the compensation system for phase deviations and amplitude deviations at the antenna 209, the maintenance operation can be simplified. Further, since the amount of transmission information on the optical fiber coupling the center unit 1D and the remote unit 2D can be small, it is able to reduce the running costs.

What is claimed is:

1. A wireless base station including a center unit and a remote unit provided with an array antenna having a plurality of antenna elements, the center unit being coupled with the remote unit through an optical fiber, wherein the center unit comprises:

a modulator for converting bit information of a transmission packet into a base band modulated signal; and a first interface for converting the base band modulated signal output from the modulator into an optical signal and transmitting the optical signal to the optical fiber, wherein the remote unit comprises:

a second interface for converting the optical signal received from the optical fiber into an electric signal and outputting the electric signal;

a signal processor unit for converting the base band modulated signal received as the electric signal from the second interface into a plurality of transmission signals corresponding to the antenna elements of the array antenna and outputting the transmission signal;

a Radio Frequency (RF) unit for converting the respective transmission signals output from the signal processor unit into the transmission signals in an RF band and supplying the transmission signals to the antenna elements of the array antenna; and a deviation detector for detecting deviations that are localized within the remote unit and that occurred among the transmission signals supplied to the respective antenna elements of the array antenna, wherein the modulator of the center unit outputs array weight information generated in an update cycle longer than a packet transmission cycle, in parallel to the base band modulated signal, wherein the first interface transmits to the optical fiber an optical signal in which the base band modulated signal and the array weight information output from the modulator are time multiplexed, wherein the second interface separates the electric signal into the base band modulated signal and the array weight information to output the base band signal and the array weight information in parallel, wherein the signal processor unit stores the array weight information received from the second interface in a memory, reads out from the memory a specific array weight information corresponding to the transmission packet, converts the base band signal received from the second interface into a plurality of transmission signals weighted in accordance with the specific array weight information and optimizes the array weight information in the memory or the plurality of transmission signals in accordance with the deviations detected by the deviation detector, wherein the signal processor unit of the remote unit generates a probe signal, and adds the probe signal to each of the plurality of transmission signals in order to supply probe signals to the antenna elements of the array antenna along with the transmission signals through the RF unit, and wherein the deviation detector extracts the probe signals from the transmission signals supplied to the respective antenna elements of the array antenna, and detects the deviations that are localized within the remote unit and that occurred among the transmission signals based on the detected probe signals.

2. The wireless base station according to claim 1, wherein the signal processor unit of the remote unit adds the probe signal to each of the transmission signals by using any one of time multiplexing, code multiplexing, and frequency multiplexing.

3. The wireless base station according to claim 1, wherein the first interface transmits to the optical fiber the optical signal by time multiplexing the base band modulated signal and the array weight information output from the modulator, wherein the remote unit includes in the signal processor unit a weight compensation unit for optimizing the array weight information stored in the memory in accordance with the deviations detected by the deviation detector, and wherein the signal processor unit weights the base band modulated signal received from the second interface in accordance with the specific array weight information having been compensated by the weight compensation unit, and converts the base band modulated signal into the plurality of transmission signals.

4. The wireless base station according to claim 1, wherein the modulator of the center unit converts the bit information of the transmission packet into a plurality of base band modulated signals corresponding to frequency channels of orthogonal frequency division multiplexing (OFDM), generates the array weight information for each of the frequency channels to output the base band modulated signals and array weight information in parallel, wherein the first interface transmits to the optical fiber an optical signal in which the base band modulated signals and the array weight information output from the modulator are time multiplexed, wherein the second interface separates the electric signal into the plurality of base band modulated signals and the array weight information to output the base band modulated signals and the array weight information in parallel, wherein the remote unit includes a weight compensation unit for optimizing the array weight information stored in the memory in accordance with the deviations detected by the deviation detector, and wherein the signal processor unit weights the plurality of base band modulated signals received from the second interface in accordance with the specific array weight information having been compensated by the weight compensation unit, and converts the base band modulated signal into the plurality of transmission signals corresponding to the antenna elements.

5. The wireless base station according to claim 4, wherein the signal processor unit of the remote unit includes:

an array processor unit for weighting the base band modulated signals on the respective frequency channels received from the second interface, in accordance with the compensated specific array weight information to convert the base band modulated signals into two-dimensional transmission signals comprised of a frequency domain signal component and a time domain signal component, and outputting the transmission signals after adding a probe signal to each of the transmission signals; and an OFDM terminating unit for converting the frequency domain signal component output from the array processor unit to the time domain signal component by inversed Fourier transform so as to output the plurality of transmission signals corresponding to the antenna elements.

6. The wireless base station according to claim 5, wherein the modulator of the center unit intermittently outputs the array weight information in accordance with an update cycle thereof.

7. A communication method for a wireless base station including a center unit and a remote unit provided with an array antenna having a plurality of antenna elements, the center unit being coupled with the remote unit through an optical fiber, the center unit executes the steps of:
converting bit information of a transmission packet into a base band modulated signal;
time multiplexing the base band modulated signal and array weight information generated in an update cycle longer than a packet transmission cycle; and
transmitting the time multiplexed base band modulated signal and the array weight information as an optical signal to the optical fiber, and the remote unit executes the steps of:
converting the optical signal received from the optical fiber into an electric signal;
separating the electric signal into the base band modulated signal and the array weight information;
storing the array weight information in a memory;
converting the base band modulated signal into a plurality of transmission signals corresponding to the antenna elements of the array antenna;
weighting each of the transmission signals in accordance with specific array weight information which is corresponding to the transmission packet and read out from the memory;
converting the weighted transmission signals into transmission signals in a radio frequency (RF) band to be supplied to the respective antenna elements of the array antenna;
detecting deviations that are localized within the remote unit and that occurred among the transmission signals supplied to the respective antenna elements of the array antenna; and
performing compensation on any one of the transmission signals or the array weight information in the memory in accordance with the deviations, wherein the remote unit further executes the steps of:
adding a probe signal to each of the weighted transmission signals before converting into the RF band transmission signals;
extracting probe signals from the RF band transmission signals supplied to the respective antenna elements of the array antenna; and
detecting the deviations in accordance with the extracted probe signals.

8. The communication method according to claim 7, wherein the center unit converts the bit information of the transmission packet into a plurality of base band modulated signals corresponding to frequency channels of orthogonal frequency division multiplexing (OFDM), generates the array weight information for each of the frequency channels to output the base modulated signals and array weight information in parallel, time multiplexes the transmission signals and the array weight information, and transmits the time multiplexed signal to the optical fiber as the optical signal, and wherein the remote unit optimizes the array weight information having been stored in the memory in accordance with the detected deviations localized within the remote, weights the plurality of base band modulated signals received from the center unit in accordance with the specific array weight information having been optimized in the memory, and converts the base band modulated signal into the plurality of transmission signals corresponding to the antenna elements.

* * * * *